(12) United States Patent
Nugier et al.

(10) Patent No.: US 12,275,277 B2
(45) Date of Patent: Apr. 15, 2025

(54) TIRE TREAD FOR A HEAVY CONSTRUCTION-PLANT VEHICLE

(71) Applicant: COMPAGNIE GENERALE DES ETABLISSEMENTS MICHELIN, Clermont-Ferrand (FR)

(72) Inventors: Franck Nugier, Clermont-Ferrand (FR); Cécile Roussel, Clermont-Ferrand (FR); Olivier Ropars, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 630 days.

(21) Appl. No.: 17/627,431

(22) PCT Filed: Jul. 15, 2020

(86) PCT No.: PCT/FR2020/051269
§ 371 (c)(1),
(2) Date: Jan. 14, 2022

(87) PCT Pub. No.: WO2021/009462
PCT Pub. Date: Jan. 21, 2021

(65) Prior Publication Data
US 2022/0314700 A1    Oct. 6, 2022

(30) Foreign Application Priority Data

Jul. 17, 2019  (FR) ...................................... 1908057

(51) Int. Cl.
*B60C 11/11*     (2006.01)
*B60C 11/03*     (2006.01)
*B60C 11/13*     (2006.01)

(52) U.S. Cl.
CPC ........... *B60C 11/11* (2013.01); *B60C 11/0311* (2013.01); *B60C 11/033* (2013.01); *B60C 2011/133* (2013.01); *B60C 2200/065* (2013.01)

(58) Field of Classification Search
CPC ........... B60C 2200/065; B60C 11/1392; B60C 11/1384; B60C 11/0311; B60C 11/033; B60C 11/11; B60C 2011/133
See application file for complete search history.

(56) References Cited

U.S. PATENT DOCUMENTS

| 4,279,283 A | 7/1981 | Hitzky |
| 4,312,395 A | 1/1982 | Baus |

(Continued)

FOREIGN PATENT DOCUMENTS

| CL | 43172 | 6/1997 |
| CL | 52033 | 6/2009 |

(Continued)

OTHER PUBLICATIONS

Office Communication dated Aug. 4, 2023 in the counterpart Chile patent application.

(Continued)

*Primary Examiner* — Justin R Fischer
*Assistant Examiner* — Philip N Schwartz
(74) *Attorney, Agent, or Firm* — COZEN O'CONNOR

(57) ABSTRACT

A Tire tread with blocks for a heavy construction-plant vehicle, to improve the compromise between traction on muddy ground and lifetime in terms of wear on rough ground. A tread (1) has blocks (4), which are separated by cuts (3) and raised with respect to a bottom surface (5). Any block (4) have a contact face (41) having a polygonal shape of surface area SC, which is contained in a tread surface (2), lateral faces (42), and a base section (43), which has a polygonal shape of surface area SB. The contact face (41) of (Continued)

any block (4) has a polygonal shape that is at least partially concave, wat least two consecutive sides (411, 412) that form between them an interior angle A1 of the polygonal shape that is greater than 180° and the surface area SC of the contact face (41) is at most equal to 0.9 times the surface area SB of the base section (43).

13 Claims, 2 Drawing Sheets

(56) References Cited

U.S. PATENT DOCUMENTS

| | | | |
|---|---|---|---|
| 6,209,602 | B1 | 4/2001 | Bonko |
| 8,950,454 | B2 | 2/2015 | Callamand et al. |
| 2008/0078488 | A1 | 4/2008 | Yoda |
| 2010/0236681 | A1 | 9/2010 | Beha |
| 2019/0275843 | A1 | 9/2019 | Misani et al. |
| 2020/0317003 | A1* | 10/2020 | Yoshida .............. B60C 11/1376 |

FOREIGN PATENT DOCUMENTS

| | | | |
|---|---|---|---|
| CL | 55988 | 5/2014 | |
| CN | 109070652 | 12/2018 | |
| GB | 2 065 041 | 6/1981 | |
| GB | 2 065 571 | 7/1981 | |
| JP | 6443508 B1 * | 12/2018 | ............. B60C 11/03 |
| WO | WO 2006/057169 | 6/2006 | |
| WO | WO 2014/131692 | 9/2014 | |
| WO | WO 2014/170283 | 10/2014 | |
| WO | WO 2018/060796 | 4/2018 | |
| WO | WO 2019/022128 | 1/2019 | |

OTHER PUBLICATIONS

Chile Patent Application No. 199500393, The Goodyear Tire & Rubber Company, dated Mar. 16, 1995.

* cited by examiner

TIRE TREAD FOR A HEAVY CONSTRUCTION-PLANT VEHICLE

RELATED APPLICATIONS

This is a U.S. National Phase Application under 35 USC 371 of International Application PCT/FR2020/051269 filed on Jul. 15, 2020.

This application claims the priority of French application no. FR 1908057 filed Jul. 17, 2019, the entire content of all of which is hereby incorporated by reference.

FIELD OF THE INVENTION

The present invention relates to a tire tread for a heavy construction-plant vehicle intended to carry heavy loads and to run on uneven, rough and/or muddy ground such as, for example, that of mines or quarries.

BACKGROUND OF THE INVENTION

A tread comprising at least one rubber-based material is intended to constitute the peripheral part of the tire and to be worn away when it comes into contact with the ground via a tread surface.

A tread can be defined by three dimensions: a thickness, in a radial direction, a width, in a transverse direction, and a length, in a longitudinal direction. For a tread integrated into the tire, the transverse and longitudinal directions are also called, respectively, the axial direction, since it is parallel to the axis of rotation of the tire, and the circumferential direction, since it is tangential to the circumference of the tire in the direction of running of the tire.

To ensure satisfactory performance in terms of longitudinal grip, under engine torque and under braking torque, and in terms of transverse grip, it is necessary to form, in the tread, a tread pattern that is a system of cuts, or voids, separating elements that are raised with respect to a bottom surface.

In the case of a tire tread for a heavy construction-plant vehicle, the raised elements are often blocks. A block is a volume of material delimited by a contact face, which is contained in the tread surface, by a bottom surface, and by lateral faces connecting the contact face to the bottom surface. The radial distance between the contact face and the bottom surface is called the height H of the block. A block is connected to the bottom surface generally by a connecting surface having a connecting radius R, which is for example substantially equal to 0.25 times the height H of the block. In the following text, there is defined, by convention, a base section radially positioned on the outside of the bottom surface at a distance H' substantially equal to the connecting radius R, the geometric dimensions of which are easily measurable. In addition, in order to characterize the size of a block in a simple way, a block will be considered to be geometrically inscribed in a cylindrical envelope surface having a radial axis of revolution and a circular section of diameter D.

In the context of the invention, the contact face and the base section of a block preferentially have polygonal shapes. The contact face of a block can be characterized geometrically by its surface area SC and its perimeter PC, the latter being the cumulative length of the edges of the polygon delimiting said contact face. The base section of a block can be characterized geometrically by its surface area SB and its perimeter PB, the latter being the cumulative length of the edges of the polygon delimiting said base section. Any lateral face can be characterized geometrically by a radial line that is the profile of its intersection with a radial plane, which contains the radial direction.

The tread, integrated into the tire, is usually characterized geometrically by a transverse width $W_T$, in the transverse direction, and a radial thickness $H_T$, in a radial direction. The transverse width $W_T$ is defined as the transverse width of the contact surface of the tread of the new tire with smooth ground, the tire being subjected to nominal pressure and load conditions recommended, for example, by the E.T.R.T.O. (European Tire and Rim Technical Organization) standard. The radial thickness $H_T$ is defined, by convention, as being the maximum radial depth measured in the cuts. Thus the radial thickness $H_T$ is equal to the maximum radial block height H. In the case of a tire for a heavy vehicle of construction-plant type, and by way of example, the transverse width $W_T$ is at least equal to 600 mm and the radial thickness $H_T$ is at least equal to 60 mm, or even 70 mm.

The normal running conditions of a tire for a heavy vehicle of construction-plant type, in particular for a quarry loader or an underground mine vehicle, are particularly harsh. By way of example, such vehicles are intended to run on tracks that are usually sloping, either uphill, which requires good grip of the tires under traction, or downhill, which requires good grip of the tires under braking. In addition, these tracks are also often winding, requiring good transverse grip of the tires. Finally, the tracks on which the vehicles run are generally made up of materials extracted in situ, for example compacted crushed rocks that are regularly damped down in order to ensure the integrity of the wearing layer of the track as the vehicles pass over it and that are often covered with mud and water: this requires both good resistance of the tread to attack, so as to ensure a satisfactory lifetime, and a good capacity both for penetration and for evacuation of this mixture of mud and water by the tread, so as to ensure satisfactory grip on muddy ground.

A tread comprising blocks and aiming to ensure good longitudinal grip, under traction and under braking, satisfactory transverse grip, mud evacuation capacity and also satisfactory resistance to mechanical attack by the materials covering the tracks, has already been described, for example in the documents WO 2014170283 and WO 2014131692.

SUMMARY OF THE INVENTION

The inventors have set themselves the an objective of further improving, for a tire tread for a heavy construction-plant vehicle, comprising blocks, the compromise between grip, in particular traction on muddy ground, and lifetime with respect to wear, especially on rough ground.

This objective has been achieved by a tire tread for a heavy construction-plant vehicle, which tread is intended to come into contact with the ground via a tread surface and comprises cuts delimiting blocks that are raised with respect to a bottom surface, in a radial direction, any block being made up of at least one rubber-based material and having a radial height H, which is measured between a contact face, contained in the tread surface, and the bottom surface, any block comprising lateral faces, which connect the contact face to the bottom surface, and a base section, which is parallel to the bottom surface radially towards the outside at a radial distance H' equal to 0.25*H, the contact face having a polygonal shape of surface area SC and perimeter PC, and the base section having a polygonal shape of surface area SB and perimeter PB, the contact face of any block having a polygonal shape that is at least partially concave, comprising at least two consecutive sides that form between them an interior angle A1 of the polygonal shape that is greater than 180°, and the surface area SC of the contact face being at most equal to 0.9 times the surface area SB of the base section.

The invention describes, for a tread with blocks, an optimized block shape having, as first essential feature, a contact face having a polygonal section that is at least partially concave, i.e. comprising at least two consecutive sides that form between them an interior angle A1 of the polygonal shape that is greater than 180°. In other words, the polygonal section of the contact face comprises at least one vertex that enters the section.

The presence of a concave part, in the contact face, increases the perimeter of its polygonal section with respect to a conventional convex polygonal section, i.e. increases the cumulative length of edges of the contact face. By definition, an edge is the intersection, in the tread surface, between the contact face and a lateral face of the block, and therefore corresponds to a side of the polygonal section. It is known that the greater the cumulative length of edges of the contact face, the higher the grip. Consequently, a contact face having a great cumulative length of sides, and therefore of edges, ensures better grip.

According to a second essential feature of the invention, the surface area SC of the contact face is at most equal to 0.9 times the surface area SB of the base section. In other words, the section of the contact face is smaller than that of the base section. The base section is chosen, by convention, radially on the outside of the bottom surface, at a radial distance H' equal to 0.25 times the height H of the block, which is the radial distance between the contact face and the bottom surface. This base section has a geometry that is more easily determinable, since it is situated radially on the outside of the connecting surface between the lateral faces of the block and the bottom surface.

A surface area differential between the contact face and the base section ensures, first of all, a better effect of perforating loose or muddy ground, easier penetration of said ground, and, consequently, improved traction of the tire. Furthermore, a block with a more massive base section is more rigid with respect to the shear forces applied in the contact face, resulting in shorter slippage distances in the tread surface and hence better wear resistance. Furthermore, a section geometry that changes with the wear of the tire makes it possible to limit the appearance of irregular forms of wear over the life of the tire. Finally, a massive base section ensures robust anchoring of the block to the bottom surface, and therefore better resistance to chunking.

Preferentially, the contact face of any block has a polygonal shape that is at least partially concave, comprising at least three pairs of two consecutive sides that form between them an interior angle (A1, A2, A3) of the polygonal shape that is greater than 180°. The more the number of concave parts increases, the more the perimeter of the contact face increases, and the more its surface area decreases, and this further improves grip and traction. The inventors have shown that, from three concave parts, the desired performance in terms of grip and traction reaches a very advantageous level. The particular case of a polygonal section with three concave parts, which was more particularly studied by the inventors, is described as a tripod block.

More preferentially, the surface area SC of the contact face is at least equal to 0.6 times the surface area SB of the base section. Below 60% of the surface area of the base section, the surface area of the contact face becomes too small to ensure sufficient contact in the tread with respect to grip, even if the perforation capacity is even better.

The base section of any block advantageously has a convex polygonal shape. This shape allows robust anchoring, a high stiffness of the block and a lower sensitivity to cracks at the foot of the block, in the knowledge that the probability of cracks appearing is greater at a reentrant corner, corresponding to a concave part, than at a salient corner, corresponding to a convex part.

According to a preferred variant, the base section of any block has a convex polygonal shape comprising at least six sides. A particular case more particularly studied by the inventors is a hexagonal section.

Advantageously, the perimeter PC of the contact face is at least equal to the perimeter PB of the base section. This feature ensures a minimum ratio between the surface area of the contact face and that of the base section.

According to a preferred embodiment, any block comprises a succession of radial portions extending, in the radial direction, between the contact face and the bottom surface. The radially outermost portions perform the function of penetration of the block into soft ground, while the radially innermost portions perform the anchoring function and provide the block with stiffness.

According to a preferential variant of the preceding preferred embodiment, any block comprises a first radial portion extending, in the radial direction, between the contact face and an intermediate section, and a second radial portion extending, in the radial direction, between the intermediate section and the bottom surface. In this particular case, the penetration of loose ground is ensured by the radially outer portion, and the anchoring stiffening of the block is ensured by the radially inner portion.

Even more particularly, in any radial plane containing the radial direction and intercepting a concave part of the contact face, the straight line of intersection of said radial plane with the first radial portion of the block, the radially outer portion, forms, with the radial direction, an angle that is at least equal to that formed by the straight line of intersection of said radial plane with the second radial portion of the block, the radially inner portion. A radial line of a lateral face of a double-slope block with a first angle, for the radially outer portion, greater than a second angle, for the radially inner portion, is thus obtained: this is particularly effective with respect to penetration into loose ground.

In the case of a block with two radial portions, the first radial portion of the block extends, in the radial direction, over a radial height H1 at least equal to 0.1 times and at most equal to 0.6 times the radial height H of the block, and the second radial portion of the block extends, in the radial direction, over a radial height H2=H−H1. If the radial height H1 is too small, the penetration into loose ground is insufficient. If the radial height H1 is too great, the anchoring of the block is insufficiently robust. This distribution of the radial heights between the two radial portions of the block therefore allows a satisfactory compromise between capacity for penetrating loose ground and robustness of the anchoring of the block.

Advantageously, the tread having a width $W_T$ and any block being inscribed in a cylindrical surface, which has a radial axis of revolution and a circular section of diameter D in any plane perpendicular to the radial axis of revolution, the circular section of the cylindrical surface in which the block is inscribed has a diameter D at least equal to 0.2 times and at most equal to 0.5 times the width $W_T$ of the tread. The size of a block can thus be characterized by the diameter of the smallest cylinder in which it is inscribed. For an envelope cylinder diameter D less than 0.2 times the width $W_T$ of the tread, the volume of the block is too small to ensure the desired performance in terms of traction and robustness. For an envelope cylinder diameter D greater than 0.5 times the width $W_T$ of the tread, the volume of the block is too high to allow the cooling of the tread, hence there is a risk of penalizing the crown of the tire in terms of endurance.

The tread having a middle part having a width W1 at least equal to 0.2 times and at most equal to 0.7 times the width $W_T$ of the tread, preferably at least equal to 0.4 times and at most equal to 0.6 times the width $W_T$ of the tread, the middle part of the tread comprises, in the transverse direction, at least one and at most four longitudinal rows of blocks, preferably two longitudinal rows of blocks. This range of numbers of rows of blocks allows a satisfactory compromise between the various aforementioned performance aspects of the tread: grip, traction, wear resistance, resistance to chunking and cooling capacity.

The middle part of the tread having a surface void ratio TES, defined as the ratio between the voids surface area and the total surface area of said middle part, the surface void ratio TES of the middle part of the tread is at least equal to 30% and at most equal to 50%. The surface void ratio TES of the middle part defines the surface void ratio of the tread when new, and characterizes the compromise between grip and wear resistance. In this embodiment, the middle part therefore has fewer voids in its surface than the lateral parts of the tread.

The middle part of the tread having a volumetric void ratio TEV, defined as the ratio between the voids volume and the total volume of said middle part, the volumetric void ratio TEV of the middle part of the tread is at least equal to 10% and at most equal to 30%. The volumetric void ratio TEV of the middle part defines the volumetric void ratio of the tread when new, and characterizes the compromise between grip and volume of wearable rubber. In this embodiment, the middle part therefore has fewer voids in its volume than the lateral parts of the tread.

The invention also relates to a tire for a heavy construction-plant vehicle, which tire comprises a tread according to any one of the embodiments described above.

BRIEF DESCRIPTION OF THE DRAWINGS

The features of the invention are illustrated by the schematic FIGS. 1 to 4, which are not drawn to scale.

DETAILED DESCRIPTION OF THE DRAWINGS

Figure 1:
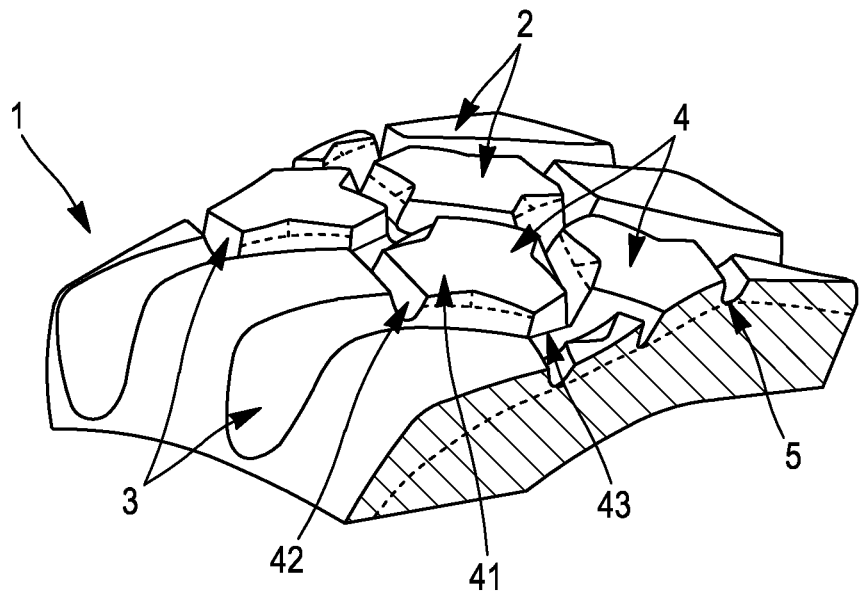
FIG. 1: Perspective view of a portion of a tread according to the invention.

FIG. 1 is a perspective view of a portion of a tread according to the invention. The tire tread 1 for a heavy construction-plant vehicle, which tread is intended to come into contact with the ground via a tread surface 2, comprises cuts 3 delimiting blocks 4 that are raised with respect to a bottom surface 5. Any block 4 comprises lateral faces 42, which connect the contact face 41 to the bottom surface 5, and a base section 43, which is parallel to the bottom surface 5.

Figure 2:
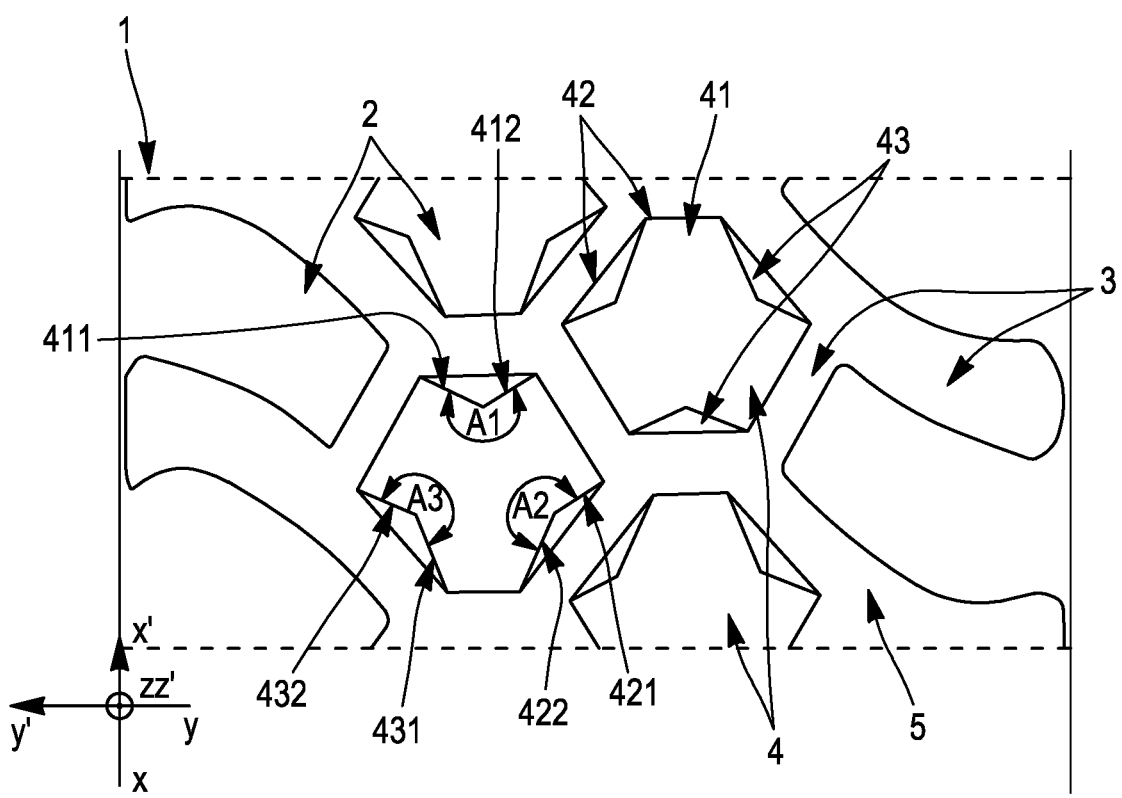
FIG. 2: View from above of a portion of a tread according to the invention.

FIG. 2 is a view from above of a portion of a tread according to the invention. As seen above, the tread 1, which tread is intended to come into contact with the ground via a tread surface 2, comprises cuts 3 delimiting blocks 4 that are raised with respect to a bottom surface 5, and any block 4 comprises lateral faces 42, which connect the contact face 41 to the bottom surface 5, and a base section 43, which is parallel to the bottom surface 5. The contact face 41 and the base section 43 respectively have a polygonal shape. In the embodiment shown, the contact face 41 of any block 4 has a polygonal shape that is at least partially concave, comprising three pairs of two consecutive sides ((411, 412); (421, 422); (431, 432)) that form between them an interior angle (A1, A2, A3) of the polygonal shape that is greater than 180°. In addition, the base section 43 of any block 4 has a convex polygonal shape comprising six sides. The tread thus shown has a tread pattern with what are known as tripod blocks.

Figure 3:
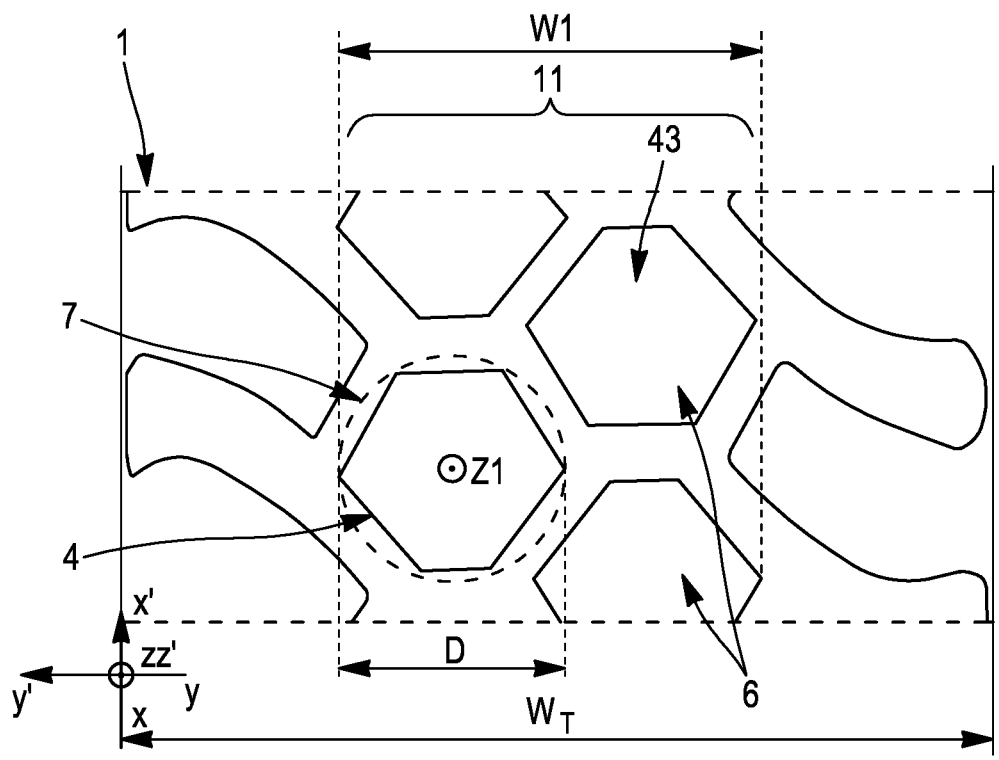
FIG. 3: Sectional view of a portion of a tread according to the invention, at the level of the base sections of the blocks.

FIG. 3 is a sectional view of a portion of a tread according to the invention, at the level of the base sections of the blocks, in which the middle part of the tread is detailed. The tread 1 has a middle part 11 having a width W1 at least equal to 0.2 times and at most equal to 0.7 times the width $W_T$ of the tread, preferably at least equal to 0.4 times and at most equal to 0.6 times the width $W_T$ of the tread. In the embodiment shown, the middle part 11 of the tread 1 comprises, in the transverse direction XX', two rows 6 of blocks 4. Any block 4 is inscribed in a cylindrical surface 7, which has a radial axis of revolution Z1 and a circular section of diameter D in any plane perpendicular to the radial axis of revolution Z1. The circular section of the cylindrical surface 7 in which the block 4 is inscribed has a diameter D at least equal to 0.2 times and at most equal to 0.5 times the width $W_T$ of the tread.

Figure 4:
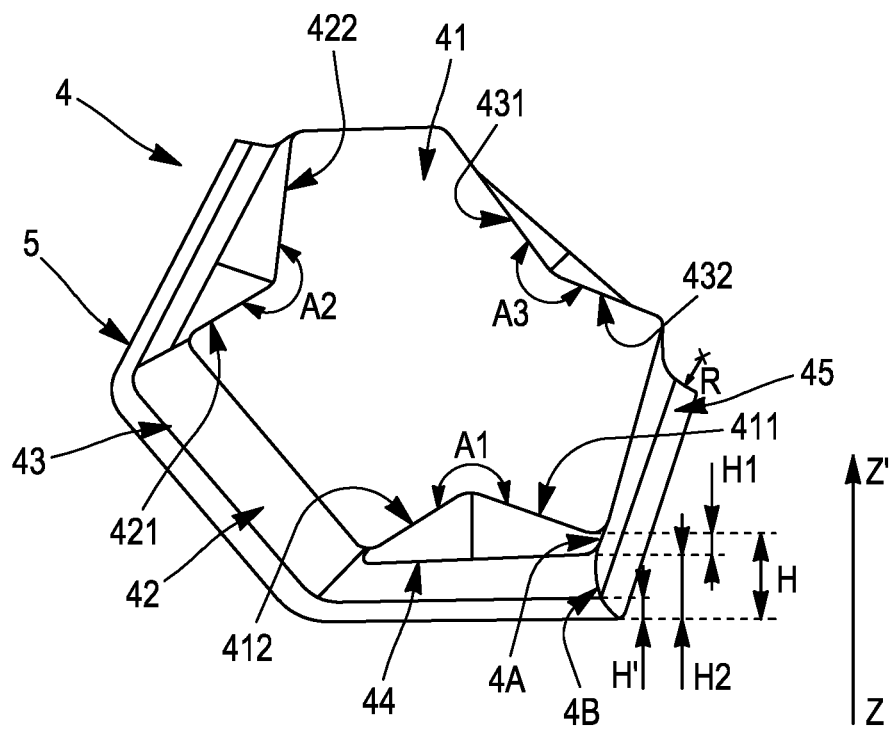
FIG. 4: Perspective view of a block of a tread according to the invention.

FIG. 4 is a perspective view of a block of a tread according to the invention. The block 4, made up of a rubber-based material, has a radial height H, which is measured between a contact face 41, contained in the tread surface 2, and the bottom surface 5. The block 4 comprises lateral faces 42, which connect the contact face 41 to the bottom surface 5, and a base section 43, which is parallel to the bottom surface 5 radially towards the outside at a radial distance equal to 0.25*H. The base section 43 is connected to the bottom surface 5 by a connecting surface 45 of radius R. The contact face 41 of the block 4 has a polygonal shape that is at least partially concave, comprising three pairs of two consecutive sides ((411, 412); (421, 422); (431, 432)) that form between them an interior angle (A1, A2, A3) of the polygonal shape that is greater than 180°. The base section 43 of the block 4 has a convex polygonal shape comprising at least six sides. The block 4 also comprises a first radial portion 4A extending, in the radial direction ZZ', between the contact face 41 and an intermediate section 44, and a second radial portion 4B extending, in the radial direction ZZ', between the intermediate section 44 and the bottom surface 5. The first radial portion 4A of the block 4 extends, in the radial direction 77', over a radial height H1 at least equal to 0.1 times and at most equal to 0.6 times the radial height H of the block, and the second radial portion 4B of the block 4 extends, in the radial direction ZZ', over a radial height H2=H−H1.

The inventors have more particularly studied this invention for a tire of size 35/65 R 33 intended to be mounted on an underground mine dumper. According to the ETRTO standard, such a tire has to be capable of carrying a load equal to 29000 kg, when it is inflated to a pressure equal to 8 bar. The tire according to the invention performs better since it is capable of carrying a load equal to 31500 kg, when it is inflated to a pressure equal to 7 bar.

The inventors have compared, in the tire size 35/65 R 33, a tread according to the invention I, comprising blocks with a contact face with three concave parts and a hexagonal convex base section, and a reference tread R, comprising blocks with a contact face and a base section that are both convex and hexagonal.

Table 1 below shows the respective characteristics of the tread according to the invention I and of the reference tread R:

TABLE 1

| Characteristics | Tread according to the invention I | Reference tread R |
|---|---|---|
| Tread width $W_T$ | 870 mm | 870 mm |
| Width of middle portion of tread W1 | 416 mm | 416 mm |
| Ratio $W1/W_T$ | 48% | 48% |
| Surface void ratio TES of the middle portion (new state) | 42.5% | 34.5% |
| Volumetric void ratio TEV of the middle portion (new state) | 20% | 19.5% |
| Number of longitudinal rows of blocks in the middle portion | 2 | 2 |
| Radial block height H | 67 mm | 67 mm |
| Radial height H1 of the first radial block portion | 11 mm | — |
| Ratio H1/H | 15% | — |
| Radial height H2 of the second radial block portion | 56 mm | — |
| Surface area SC of the contact face of a block | 326 mm$^2$ | 371 mm$^2$ |
| Perimeter PC of the contact surface of a block | 744 mm | 714 mm |
| Surface area SB of the base section of a block | 425 mm$^2$ | 425 mm$^2$ |
| Perimeter PB of the base section of a block | 765 mm$^2$ | 765 mm$^2$ |
| Ratio SC/SB | 76% | 87% |
| Ratio PC/PB | 97% | 93% |
| Diameter D of the cylindrical envelope surface of a block | 250 mm | 250 mm |
| Ratio $D/W_T$ | 29% | 29% |
| Connecting radius R between the connecting surface of a block and the bottom surface | 20 mm | 20 mm |

In this example, compared with the reference, the inventors thus reduced the surface area SC of the contact face of each block by 12%, increased the perimeter PC of the contact face of each block by 4%, and increased the surface void ratio TES by 8% for a substantially constant volumetric void ratio TEV (therefore for a constant volume of material), without reducing the surface area of the base section (therefore without reducing the robustness of the anchoring of the blocks). Consequently, the increase in pressure on the ground, due to the reduction in the surface area of the contact face of the block, leads to an improvement in the penetration into the ground, hence better traction on loose ground. The increase in the perimeter PC of the contact face of the block, and therefore in the cumulative length of edges, results in an improvement in grip on smooth ground. Finally, retaining the volume of material ensures that the lifetime in terms of wear and the robustness of the blocks are maintained compared with the reference.

The tread according to the invention, which was developed for a conventional tire subjected to an inflation pressure, can also be used for a non-pneumatic tire, but also for any non-pneumatic rolling assembly intended to be fitted to an all-terrain vehicle, such as for example a caterpillar track.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A tire tread for a heavy construction-plant vehicle, which tread is intended to come into contact with the ground via a tread surface and comprises cuts delimiting blocks that are raised with respect to a bottom surface, in a radial direction (ZZ'),
   any block being made up of at least one rubber-based material and having a radial height H, which is measured between a contact face, contained in the tread surface, and the bottom surface,
   any block comprising lateral faces, which connect the contact face to the bottom surface, and a base section, which is parallel to the bottom surface radially towards the outside at a radial distance H' equal to 0.25*H,
   the contact face having a polygonal shape of surface area SC and perimeter PC, and the base section having a convex polygonal shape of surface area SB and perimeter PB,
   wherein the perimeter PC of the contact face of any block is at least partially concave, comprising at least two consecutive sides that form between them an interior angle A1 of the polygonal shape that is greater than 180° and in that the surface area SC of the contact face is at most equal to 0.9 times the surface area SB of the base section.

2. The tread according to claim 1, wherein the contact face of any block has a polygonal shape that is at least partially concave, comprising at least three pairs of two consecutive sides that form between them an interior angle (A1, A2, A3) of the polygonal shape that is greater than 180°.

3. The tread according to claim 1, wherein the surface area SC of the contact face is at least equal to 0.6 times the surface area SB of the base section.

4. The tread according to claim 1, wherein the base section of any block has a convex polygonal shape comprising at least six sides.

5. The tread according to claim 1, wherein the perimeter PC of the contact face is at least equal to the perimeter PB of the base section.

6. The tread according to claim 1, wherein any block comprises a succession of radial portions (4A, 4B) extending, in the radial direction (ZZ'), between the contact face and the bottom surface.

7. The tread according to claim 1, wherein any block comprises a first radial portion (4A) extending, in the radial direction (ZZ'), between the contact face and an intermediate section, and a second radial portion (4B) extending, in the radial direction (ZZ'), between the intermediate section and the bottom surface.

8. The tread according to claim 7, wherein the first radial portion (4A) of the block extends, in the radial direction (ZZ'), over a radial height H1 at least equal to 0.1 times and at most equal to 0.6 times the radial height H of the block, and the second radial portion (4B) of the block extends, in the radial direction (ZZ'), over a radial height H2=H−H1.

9. The tread according to claim 1, the tread having a width WT and any block being inscribed in a cylindrical surface, which has a radial axis of revolution (Z1) and a circular section of diameter D in any plane perpendicular to the radial axis of revolution (Z1), wherein the circular section of the cylindrical surface in which the block is inscribed has a diameter D at least equal to 0.2 times and at most equal to 0.5 times the width WT of the tread.

10. The tread according to claim 1, the tread having a middle part having a width W1 at least equal to 0.2 times and at most equal to 0.7 times a width WT of the tread, wherein a middle part of the tread comprises, in the transverse direction (XX'), at least one and at most four longitudinal rows of blocks.

11. The tread according to claim 10, a middle part of the tread having a surface void ratio TES, defined as the ratio between the voids surface area and the total surface area of said middle part, wherein the surface void ratio TES of the middle part of the tread is at least equal to 30% and at most equal to 50%.

12. The tread according to claim 10, the middle part of the tread having a volumetric void ratio TEV, defined as the ratio between the voids volume and the total volume of said middle part, wherein the volumetric void ratio TEV of the middle part of the tread is at least equal to 10% and at most equal to 30%.

13. A tire for a heavy construction-plant vehicle, which tire comprises a according to claim 1.

* * * * *